US012703141B2

(12) United States Patent
Messori et al.

(10) Patent No.: US 12,703,141 B2
(45) Date of Patent: Aug. 11, 2026

(54) COMPOSITION OF PHOTOPOLYMERIZABLE RESINS AND METHOD TO PRODUCE AN ARTICLE USING THIS COMPOSITION

(71) Applicant: MAT3d S.r,l., Reggio Emilia (IT)

(72) Inventors: Massimo Messori, Modena (IT); Federica Bondioli, Turin (IT); Giampaolo Melli, Reggio Emilia (IT)

( * ) Notice: Subject to any disclaimer, the term of this patent is extended or adjusted under 35 U.S.C. 154(b) by 803 days.

(21) Appl. No.: 18/009,781

(22) PCT Filed: Jun. 17, 2021

(86) PCT No.: PCT/EP2021/066359

§ 371 (c)(1),
(2) Date: Dec. 12, 2022

(87) PCT Pub. No.: WO2021/255150

PCT Pub. Date: Dec. 23, 2021

(65) Prior Publication Data

US 2023/0286210 A1 Sep. 14, 2023

(30) Foreign Application Priority Data

Jun. 19, 2020 (IT) ........................ 102020000014725

(51) Int. Cl.

| | |
|---|---|
| ***B29C 64/124*** | (2017.01) |
| ***C08K 5/3445*** | (2006.01) |
| ***C08K 5/51*** | (2006.01) |
| ***C08L 33/10*** | (2006.01) |
| ***C08L 75/16*** | (2006.01) |
| *B29K 33/00* | (2006.01) |
| *B29K 105/00* | (2006.01) |
| *B33Y 10/00* | (2015.01) |
| *B33Y 70/00* | (2020.01) |
| *B33Y 80/00* | (2015.01) |

(52) U.S. Cl.

CPC .......... *B29C 64/124* (2017.08); *C08K 5/3445* (2013.01); *C08K 5/51* (2013.01); *C08L 33/10* (2013.01); *C08L 75/16* (2013.01); *B29K 2033/12* (2013.01); *B29K 2105/0002* (2013.01); *B33Y 10/00* (2014.12); *B33Y 70/00* (2014.12); *B33Y 80/00* (2014.12); *C08L 2312/06* (2013.01)

(58) Field of Classification Search

None

See application file for complete search history.

(56) References Cited

U.S. PATENT DOCUMENTS

| | | | | |
|---|---|---|---|---|
| 9,387,056 | B2 * | 7/2016 | Wachter | A61C 13/082 |
| 9,675,435 | B2 * | 6/2017 | Karazivan | A61B 5/0088 |
| 10,238,476 | B2 * | 3/2019 | Karazivan | A61C 13/09 |
| 10,456,228 | B2 * | 10/2019 | Karazivan | A61C 5/70 |
| 10,519,319 | B2 * | 12/2019 | Lin | G03F 7/0037 |
| 10,624,820 | B2 * | 4/2020 | Bonderer | A61K 6/807 |
| 10,849,724 | B2 * | 12/2020 | Sun | A61K 6/887 |
| 10,934,379 | B2 * | 3/2021 | Bonderer | C08F 222/1065 |
| 11,045,295 | B2 * | 6/2021 | Karazivan | A61C 5/30 |
| 11,485,818 | B2 * | 11/2022 | Govindarajan | G03F 7/027 |
| 11,584,827 | B2 * | 2/2023 | Parkar | B29C 64/165 |
| 11,697,696 | B2 * | 7/2023 | Rist | A61K 6/17 433/218 |
| 2018/0258290 | A1 * | 9/2018 | Lin | G03F 7/029 |
| 2019/0374309 | A1 * | 12/2019 | Parkar | B33Y 50/02 |

FOREIGN PATENT DOCUMENTS

| | | | | | |
|---|---|---|---|---|---|
| CN | 107847297 | A | * | 3/2018 | A61C 7/12 |
| EP | 1437624 | A1 | | 7/2004 | |
| EP | 0833205 | B1 | * | 10/2007 | B33Y 70/10 |
| EP | 3501837 | A1 | | 6/2019 | |
| JP | 2019519405 | A | | 7/2019 | |
| WO | 204807 | A1 | | 7/2004 | |
| WO | WO-2016182444 | A1 | * | 11/2016 | A01N 43/40 |

OTHER PUBLICATIONS

Bail et al. Effect of a red-shifted benzotriazole UV absorber on curing depth and kinetics in visible light initiated photopolymer resins for 3D printing. Journal of Industrial and Engineering Chemistry. vol. 38, Jun. 25, 2016, pp. 141-145 (Year: 2016).*

International Searching Authority: International Search Report for corresponding International application No. PCT/EP2021/066359 dated Sep. 9, 2021.

* cited by examiner

*Primary Examiner* — Sanza L. McClendon

(74) *Attorney, Agent, or Firm* — Patterson Intellectual Property Law, PC

(57) ABSTRACT

There are described compositions of photopolymerizable resins containing functional (meth)acrylic groups and one or more radical polymerization photoinitiators, stereolithographic methods of producing articles using these resins and articles thus obtained.

9 Claims, No Drawings

COMPOSITION OF PHOTOPOLYMERIZABLE RESINS AND METHOD TO PRODUCE AN ARTICLE USING THIS COMPOSITION

The present invention relates to a composition of photopolymerizable resins, to a method to produce an article using this composition and to the article thus obtained.

BACKGROUND OF THE INVENTION

The production of three-dimensional articles of complex shape by VAT photopolymerization has been known for many years. In this technique, the article of the desired shape is produced starting from a liquid resin polymerizable by irradiation with radiations of a suitable wavelength, alternating a sequence of two steps (a) and (b). In step (a) a layer consisting of a photopolymerizable liquid composition is treated with a suitable radiation, generally produced by a laser source controlled by a computer, on the whole of the extension of the cross section of the object to be formed, and in step (b) the layer thus polymerized is covered with a new layer of the photopolymerizable liquid composition, and the sequence of the steps (a) and (b) is repeated until obtaining a "green" model of the desired finished three-dimensional article. This "green" model is not yet completely polymerized and must normally be subjected to post-curing.

An important aspect for the users of VAT photopolymerization is the performance at high temperature of the articles obtained after post-curing. This performance can be measured by properties such as Heat Deflection Temperature "HDT" or Glass Transition Temperature (Tg), in addition to the normal physical-mechanical properties of synthetic resins.

Italian patent application No. 102018000008679, filed on 18 Sep. 2018, disclosed a method of manufacturing punches of elastomeric material for forming the surface of ceramic tiles via 3D printing with technologies such as stereolithography (SL), Digital Light Processing (DLP), LCD stereolithography (SLLCD) and the like.

The aforesaid application also describes photopolymerizable resins for producing said punches, which essentially comprise oligomers of polyethylene glycol (PEG) type.

The photopolymerizable oligomers described belong to the medium-low molecular weight PEG family and contain acrylic or methacrylic reactive functional groups. Depending on the molecular weight of the initial liquid acrylate/methacrylate PEG, at the end of the 3D printing process it is possible to obtain solid materials.

By suitably selecting the initial blend of oligomers, it is possible to obtain rubbery/elastomeric materials characterized by Shore A hardness values that vary between 20 and 80. In all cases, the crosslinking density, i.e., the number of crosslinking points per unit of mass or volume formed following the 3D printing process, is classifiable as medium-low.

EP 1 437 624 A1 discloses stereolithographic resins containing oxetane compounds, in particular compositions of certain polyepoxy resins combined with certain poly(meth)acrylate resins.

EP 1 508 834 A2 discloses liquid, radiation-curable compositions which are particularly suitable for the production of three-dimensional articles by stereolithography. The resin compositions include poly(meth)acrylate resins and contain silica-type nanoparticle fillers from which cured three-dimensional shaped articles can be formed.

U.S. Pat. No. 5,434,196 discloses resin compositions for optical moulding which comprise actinic radical-curable and cationically polymerizable organic substances, and actinic radiation-sensitive initiator for cationic polymerization.

US 2016/0369104 A1 discloses hardcoat formulations that cure into interpenetrating crosslinked acrylate polymers and crosslinked epoxy polymers. The epoxy polymers can comprise polysiloxane moieties and/or aliphatic moieties. The acrylate polymers can comprise aliphatic moieties and/or urethane moieties. UV initiator compounds can be used to initiate the curing process upon exposure to UV light.

The material obtained with the resins of the prior art method, however, do not allow the production of articles that maintain characteristics of stiffness at high temperatures as it would be desirable for certain applications.

Therefore, there is the need for articles that maintain characteristics of stiffness at high temperatures, for example up to 250° C., and which can be produced with additive manufacturing processes such as stereolithography and other similar processes.

SUMMARY OF THE INVENTION

Therefore, an object of the present invention is to provide a composition of photopolymerizable resins that allows additive manufacturing of articles that maintain features of stiffness at high temperatures, for example up to 250° C.

Another object of the present invention is to provide an article made of hardened synthetic resins provided with features of stiffness at high temperatures, for example up to 250° C., defined as HTM ("High Thermo-Mechanical") resins.

A further object of the present invention is to provide an additive manufacturing method of an article with features of stiffness at high temperatures, for example up to 250° C.

Therefore, an aspect of the present invention concerns a composition of photopolymerizable resins comprising:

(A) Derivatives of diurethane dimethacrylates having the following formula:

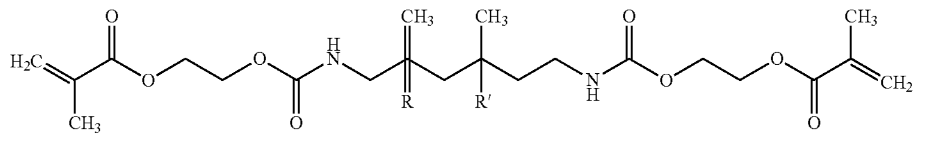

wherein R and R' are the same or different, and are selected from H and methyl, and/or its oligomers with a molecular weight up to 6000 g/mol; and (B) One or more of the following (meth)acrylic monomers:

(I)

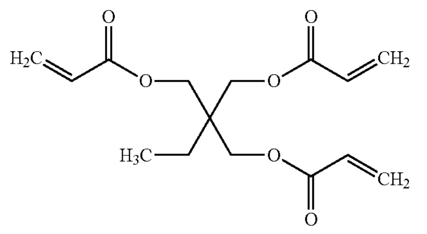

Trimethylolpropane triacrylate (TMPTA)

(II)

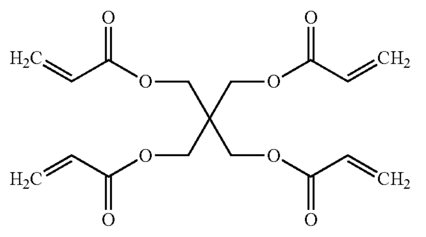

Pentaerythritol tetraacrylate (III)

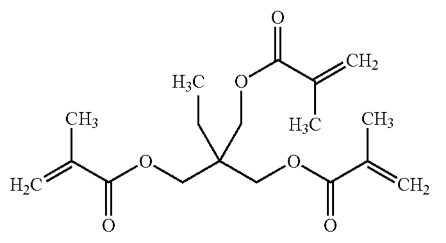

Trimethylolpropane trimethacrylate (TMPTMA)

(C) One or more radical polymerization photoinitiators for said monomers and/or oligomers.

Another aspect of the present invention concerns a method to form a three-dimensional article comprising the following steps:

(1) depositing a first thin layer of the composition of photopolymerizable resins as defined above on a surface;

(2) exposing said thin layer to a photopolymerizing radiation of sufficient intensity to cause the resins of said thin layer to polymerize;

(3) depositing a second thin layer of said composition of photopolymerizable resins on said first thin layer previously exposed to said photopolymerizing radiation;

(4) exposing said second thin layer to said photopolymerizing radiation of sufficient intensity to cause the resins of said second thin layer to polymerize and to cause adhesion to said first thin layer; and (5) repeating steps (3) and (4) a sufficient number of times to manufacture said article; and (6) subjecting the article obtained to a post-curing treatment comprising irradiation with a radiation of a wavelength between 300 and 450 nm, at a temperature between 50 and 100° C. and for a time between 30 and 90 minutes.

A further aspect of the present invention concerns an HTM resin article obtained by photopolymerization of the composition of photopolymerizable resins defined above, having a Shore D hardness between 50 and 90 measured according to ISO 868.

DESCRIPTION OF THE INVENTION

The term “liquid” used in the present description is meant as “liquid at room temperature”, which is a temperature between 5° C. and 30° C.

The term “(meth)acrylate” as used in the present description designates both acrylates and methacrylates.

The new composition according to the invention is a composition of photopolymerizable resins comprising:

(A) Derivatives of diurethane dimethacrylates having the following formula:

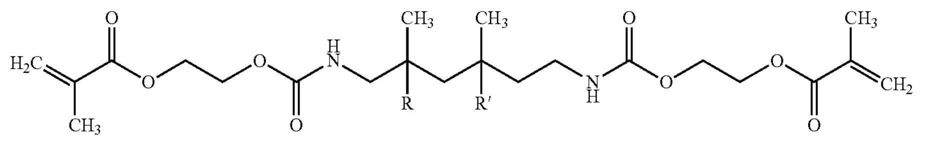

wherein R and R' are the same or different, and are selected from H and methyl, and/or its oligomers with a molecular weight up to 6000 g/mol; and (B) One or more of the following (meth)acrylic monomers:

(I)

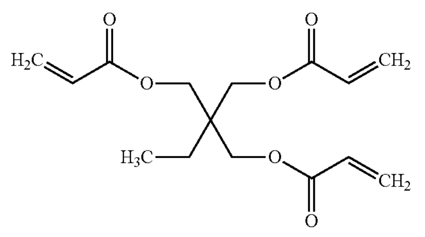

Trimethylolpropane triacrylate (TMPTA)

(II)

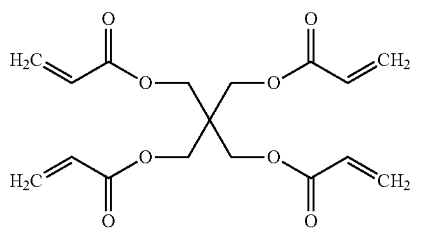

Pentaerythritol tetraacrylate (III)

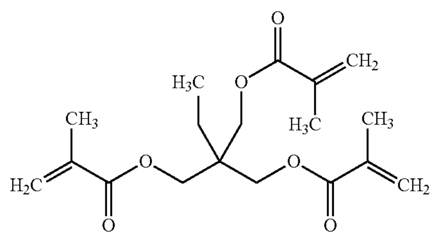

Trimethylolpropane trimethacrylate (TMPTMA)

(C) One or more radical polymerization photoinitiators for said monomers and/or oligomers.

A preferred photoinitiator is the phenylbis(2,4,6-trimethylbenzoyl)phosphine oxide having the following formula (IV):

(IV)

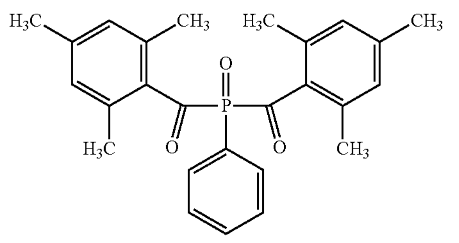

Preferably, the composition also includes a component (D) consisting of one or more additives chosen from the group consisting of organic and inorganic dyes and UV absorbers for the control of the printing resolution with high absorbance at the typical wavelengths of the radiant sources.

The blend of two or more monomers and/or oligomers (A) and (B) makes it possible to obtain a suitable compromise between viscosity of the liquid blend and final crosslinking density. In fact, the viscosity is sufficiently low to allow correct processing/printing. The crosslinking density, expressed as number of crosslinking points per unit of mass, is high and allows high thermal-mechanical (HTM) properties to be obtained.

Preferably, the monomers and/or oligomers (A) and (B) have a viscosity at room temperature between 100 and 1000 mPa·s.

The component (A) is preferably present between 60 and 90% by mass.

The component (B) is preferably present between 10 and 40% by mass.

The component (C) is preferably present between 0.5 and 3% by mass.

The component (D) is preferably present between 0.005 and 0.05% by mass.

The functional groups reactive at the photopolymerization reactions of the oligomers are of acrylic and/or methacrylic type.

In an embodiment, the component (A) is the reactive oligomer composed of an aliphatic urethane methacrylate resin with two acrylic functions and a viscosity of around 7000 mPa·s, such as the product with the trade name Allnex Ebecryl® 4859. In an embodiment, the component (B) is the reactive oligomer trimethylolpropane triacrylate (TMPTA).

In an embodiment, the component (C) is the photoinitiator bis-acylphosphine oxide, such as the product with the trade name IGMResins Omnirad® 819.

In an embodiment, the component (D) is the dye2-phenyl-4-[(1-phenyl-1,5-dihydro-3-methyl-5-oxy-4H-pyrazol-4-ylidene)methyl]-2,4-dihydro-5-methyl-3H-pyrazol-3-one, such as the product with the trade name Oracet® Yellow 130 by BASF AG.

The reactive oligomers containing acrylic or methacrylic groups undergo a radical photopolymerization chain reaction. The start of the polymerization/crosslinking reaction takes place following dissociation of the photoinitiators with formation of free radicals.

Dissociation of the photoinitiator is caused by irradiation of the system with an electromagnetic radiation of suitable frequency (wavelength). The wavelength of the radiation is variable from around 300 nm to 450 nm as a function of the VAT photopolymerization printer used.

The liquid compositions are obtained by mechanical blending of the various components at room temperature. To facilitate the dissolution process of the solid components such as the photoinitiator and the dye, these are previously dissolved in the least viscous reactive monomer/oligomer. After obtaining a homogeneous solution, the reactive oligomer with the highest viscosity is added and mixed.

The liquid composition can be used in an additive manufacturing stereolithography method, to form a three-dimensional article comprising the following steps:

(1) depositing a first thin layer of the composition of photopolymerizable resins on a surface;

(2) exposing said thin layer to a photopolymerizing radiation of sufficient intensity to cause the resins of said thin layer to polymerize;

(3) depositing a second thin layer of said composition of photopolymerizable resins on said first thin layer previously exposed to said photopolymerizing radiation;

(4) exposing said second thin layer to said photopolymerizing radiation of sufficient intensity to cause the resins of said second thin layer to polymerize and to cause adhesion to said first thin layer; and (5) repeating steps (3) and (4) a sufficient number of times to manufacture said article; and (6) subjecting the article obtained to a post-curing treatment comprising irradiation with a radiation of a wavelength between 300 and 450 nm, at a temperature between 50 and 100° C. and for a time between 30 and 90 minutes.

According to an embodiment, the additive manufacturing method is a bottom-up stereolithography method, wherein:

the liquid resin is poured into a printing tank with a transparent bottom;

a growth platform is lowered creating a first thin layer of liquid resin on the transparent bottom of the tank;

the first layer is selectively cross-linked/solidified following irradiation coming from a suitable source, such as a laser point source or LCD, positioned under the tank;

the growth platform, on which the solidified part remains attached, is lifted to allow the creation of a new thin layer of liquid resin on the transparent bottom of the tank;

the process is repeated for a sufficient number of layers to produce the three-dimensional object as per digital project.

The crosslinking/solidification chemical reaction is not generally completed during the printing step, which thus produces a "green" article. In particular, due to chemical-physical vitrification phenomena, chemical conversion remains below 100%. To complete the chemical reaction and thus develop the maximum crosslinking density value and optimization of the thermo-mechanical properties of the end product, a post-curing step is required, i.e., a heat and/or irradiation treatment adapted to promote completion of the chemical reactions.

An example of post-curing treatment consists of exposure to UV irradiation (wavelength of 405 nm), at the temperature of around 70° C. and for a time of 1 hour. The examples set forth below illustrate some embodiments of the invention and are provided by way of non-limiting example.

EXAMPLES

The following examples show the amount of each component (A), (B), (C) and (D) in the photopolymerizable resins according to the invention.

Example 1

| Components | Concentration (% mass) |
|---|---|
| Reactive oligomer Allnex Ebecryl ® 4859 (Component A) | 79.0 |
| Reactive oligomer trimethylolpropane triacrylate (Component B) | 18.5 |
| Photoinitiator bis-acylphosphine oxide (Component C) | 2.0 |
| Dye 2-phenyl-4-[(1-phenyl-1,5-dihydro-3-methyl-5-oxy-4H-pyrazol-4-ylidene)methyl]-2,4-dihydro-5-methyl-3H-pyrazol-3-one (Component D) | 0.5 |

Example 2

| Components | Concentration (% mass) |
|---|---|
| Reactive oligomer Allnex Ebecryl ® 4859 (Component A) | 59.0 |
| Reactive oligomer trimethylolpropane triacrylate (Component B) | 38.5 |
| Photoinitiator bis-acylphosphine oxide (Component C) | 2.0 |
| Dye 2-phenyl-4-[(1-phenyl-1,5-dihydro-3-methyl-5-oxy-4H-pyrazol-4-ylidene)methyl]-2,4-dihydro-5-methyl-3H-pyrazol-3-one (Component D) | 0.5 |

Example 3

| Components | Concentration (% mass) |
|---|---|
| Reactive oligomer Allnex Ebecryl ® 4859 (Component A) | 39.0 |
| Reactive oligomer trimethylolpropane triacrylate (Component B) | 58.5 |
| Photoinitiator bis-acylphosphine oxide (Component C) | 2.0 |
| Dye 2-phenyl-4-[(1-phenyl-1,5-dihydro-3-methyl-5-oxy-4H-pyrazol-4-ylidene)methyl]-2,4-dihydro-5-methyl-3H-pyrazol-3-one (Component D) | 0.5 |

Table 1 below gives some properties of the compositions of Examples 1-3.

TABLE 1

| Example | Viscosity (mPa s) | Conservative modulus[1,2] at 25° C. (MPa) | Conservative modulus[1,2] at 100° C. (MPa) | Glass transition temperature[1,3] (° C.) |
|---|---|---|---|---|
| 1 | 700-800 | 2700 | 850 | 150 |
| 2 | 600-700 | 2900 | 950 | 110 |
| 3 | 400-500 | 2400 | 790 | 60 |

[1]After post-curing: 1 hour at the temperature of 70° C. and with UV irradiation
[2]Determined by dynamic-mechanical analysis at the frequency of 1 Hz, according to ISO 6721
[3]Determined by dynamic-mechanical analysis at the frequency of 1 Hz and at the loss factor peak (loss factor, tan ™), according to ISO 6721

The material obtained following 3D printing with the HTM resins has a hard and vitreous consistency with Shore D hardness between 50 and 90, measured according to ISO 868.

Application of the material obtained following 3D printing from HTM resins relates to the production of articles intended for any purpose which requires the use of a plastic material with features of stiffness at high temperatures (up to 250° C.). A specific example of the use of this material is in the production of mould inserts to be used in the injection moulding of thermoplastic polymers.

Compared to the PEG resins described in the Italian patent application No. 102018000008679 cited previously, the articles obtained from HTM resins according to the present invention show the main differences indicated in Table 2:

TABLE 2

| Type of resin | Chemical structure | Hardness | Elastic modulus (MPa) | Post-curing treatment | Use at high temperature (>150° C.) |
|---|---|---|---|---|---|
| PEG Base | Poly(ethylene glycol) diacrylate | 20-80 Shore A | 0.1-10 | No | No |
| HTM | Esters of acrylic or methacrylic acid, acrylic or methacrylic urethanes | 50-90 Shore D | 1000-5000 | Yes | Yes |

The advantage of the HTM resins according to the present invention in allowing the production of three-dimensional articles that are easy to design and of high quality with a highly reliable process must also be highlighted.

The invention claimed is:

1. A composition of photopolymerizable resins consisting of:

(A) derivatives of diurethane dimethacrylates having the following formula:

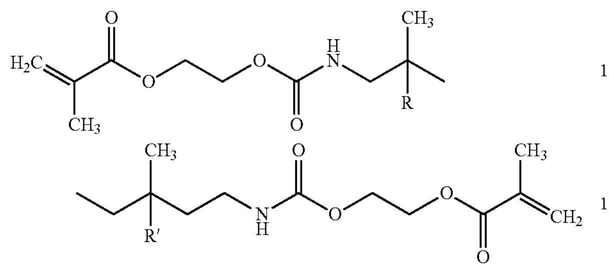

wherein R and R' are the same or different, and are selected from H and methyl, and/or its oligomers with a molecular weight up to 6000 g/mol;

(B) one or more of the following (meth)acrylic monomers:

(I)

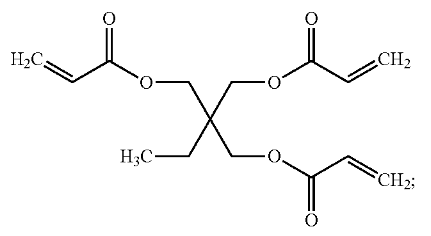

Trimethylolpropane triacrylate (TMPTA)

(II)

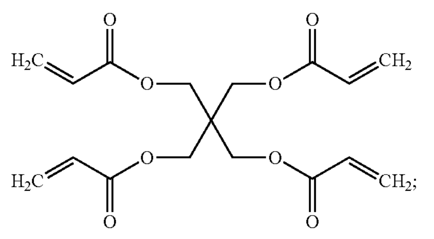

Pentaerythritol tetraacrylate (III)

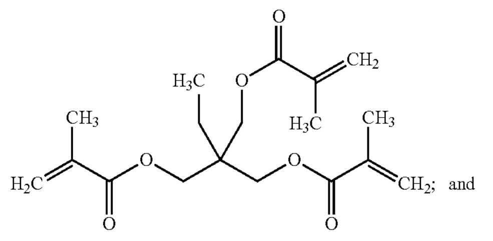

and

Trimethylolpropane trimethacrylate (TMPTMA)

(C) one or more radical polymerization photoinitiators for said monomers and/or oligomers; and (D) one or more additives chosen from the group consisting of organic and inorganic dyes and UV absorbers for the control of the printing resolution with high absorbance at the typical wavelengths of the radiant sources.

2. The composition of claim 1, wherein said monomers and/or oligomers have a viscosity at room temperature between 100 and 1000 mPa·s.

3. The composition of claim 1, wherein said component (A) is present in an amount from 60 to 90% by mass.

4. The composition of claim 1, wherein said component (B) is present in an amount from 10 to 40% by mass.

5. The composition of claim 1, wherein said component (C) is present in an amount from 0.5 to 3% by mass.

6. The composition of claim 1, wherein said component (D) is present in an amount from 0.005 to 0.05% by mass.

7. A method to form a three-dimensional article, the method comprising:

(1) depositing on a surface a first thin layer of the composition of photopolymerizable resins according to claim 1;

(2) exposing said thin layer to a photopolymerizing radiation of sufficient intensity to cause the resins of said thin layer to polymerize;

(3) depositing a second thin layer of said composition of photopolymerizable resins on said first thin layer previously exposed to said photopolymerizing radiation;

(4) exposing said second thin layer to said photopolymerizing radiation of sufficient intensity to cause the resins of said second thin layer to polymerize and to cause adhesion to said first thin layer;

(5) repeating steps (3) and (4) a sufficient number of times to manufacture said article; and (6) subjecting the article obtained to a post-curing treatment comprising irradiation with a radiation of a wavelength between 300 and 450 nm, at a temperature between 5° and 100° C. and for a time between 30 and 90 minutes.

8. The method of claim 7, wherein:

in said step (1) said composition of photopolymerizable resins is poured into a printing tank with a transparent bottom, creating said first thin layer on the bottom of said tank;

in said step (2) a growth platform is lowered to the bottom of said tank and said first layer is irradiated by a suitable source positioned underneath the tank, in order to solidify said resins;

in said step (3) said growth platform, on which the solidified part of said photopolymerizable resins remains attached, is lifted and another part of photopolymerizable resin is poured on the bottom of said tank with the formation of a second thin layer of liquid resin on the transparent bottom of said tank;

in said step (4) said growth platform is lowered to the bottom of said tank and said second layer is irradiated by said source positioned underneath the tank, in order to solidify said second layer of resins on said first layer of resins;

in said step (5) the process is repeated for a sufficient number of layers to produce said three-dimensional article; and in said step (6) said article undergoes said post-curing treatment.

9. An HTM resin article obtained by photopolymerization of said composition of photopolymerizable resins according to claim 1, said article having a Shore D hardness between 50 and 90 measured according to ISO 868.

* * * * *